Feb. 8, 1938.   R. A. CROCKETT ET AL   2,107,933
HEATING SYSTEM AND METHOD
Filed April 29, 1935   2 Sheets-Sheet 2

Inventors
Robert Arthur Crockett
Robert Henry Crockett

By Murray & Zugelter
Attorneys.

Patented Feb. 8, 1938

2,107,933

UNITED STATES PATENT OFFICE 2,107,933

HEATING SYSTEM AND METHOD

Robert Arthur Crockett and Robert Henry Crockett, Cincinnati, Ohio

Application April 29, 1935, Serial No. 18,830

9 Claims. (Cl. 237—1)

This invention relates to a novel heating system or apparatus, and a method of heating buildings having one or more compartments or rooms, vehicles, boats, aircraft and the like.

An object of the invention is to provide for heating a building or the like by the use of means utilizing the heat of friction of a gas or a liquid, under pressure or otherwise, forced through a circulating system including heat radiators.

Another object of the invention is to provide a heating system of the above stated character which is clean, convenient, efficient and economical, and which requires little or no attention throughout the cold weather season.

Another object of the invention is to provide a heating system that may be operated by using any available type of power, such as electricity, steam, water or wind power.

The foregoing and other objects are attained by the means described herein and disclosed in the accompanying drawings, in which.

It is well known that a gas or liquid, (any fluid), when forced through an orifice or passage that affords resistance to the movement of such fluid, will produce a considerable frictional heat that may be utilized for air conditioning purposes. Several devices heretofore have been proposed for utilization of the frictional heat of air when moved through or past obstructed or uneven surfaces, but such devices apparently have not enjoyed public approval and adoption for various reasons. The prior devices referred to are those disclosed in the patents of Henson 1,366,455, Allen 1,682,102, and Gilroy 823,856. The device of the present invention will readily be found to possess many advantages over kindred devices heretofore designed for heating buildings, vehicles, and compartments of various kinds.

Figure 1:
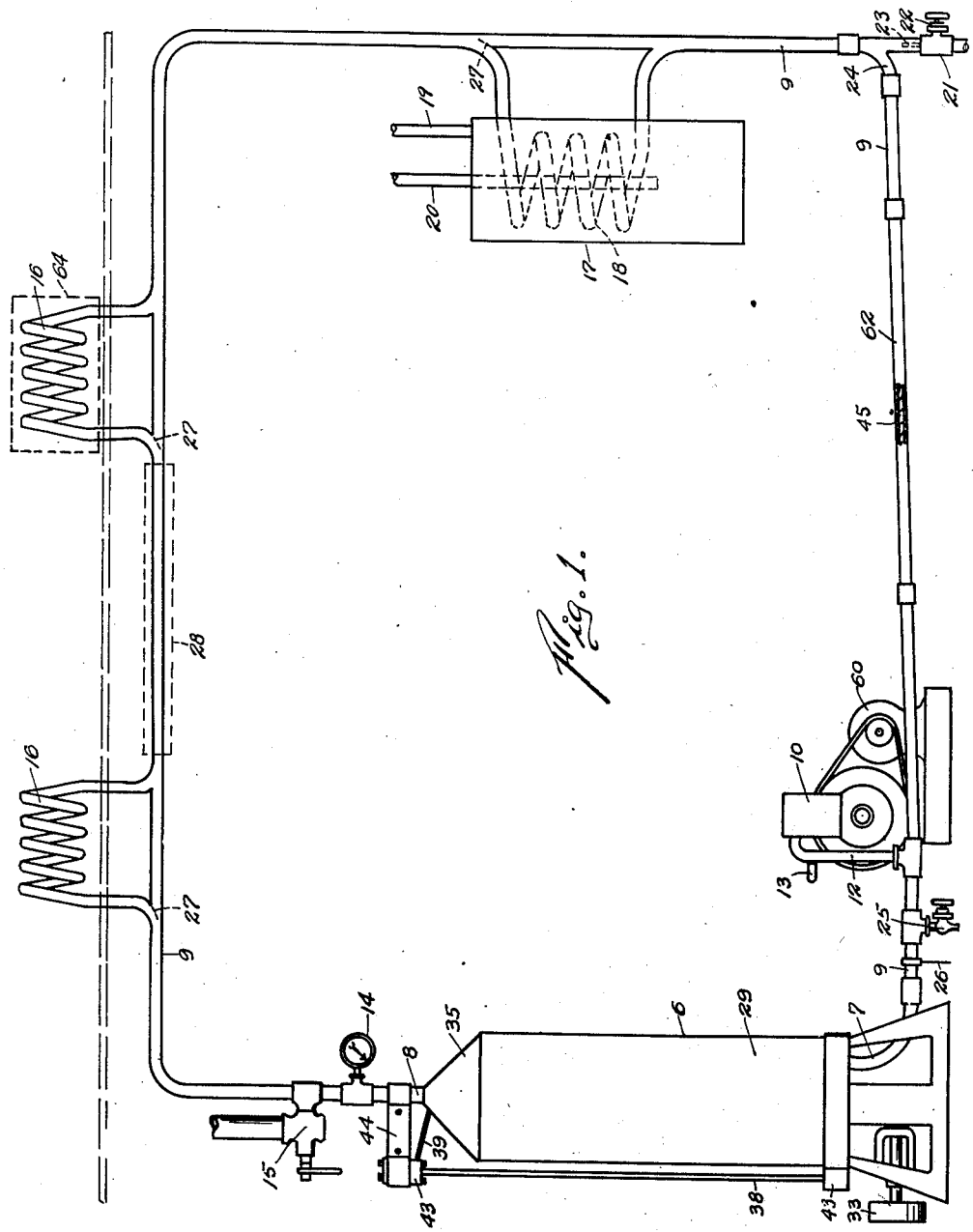
Fig. 1 is a diagrammatical view of the heating system of the present invention.

In the drawings, Fig. 1 illustrates the general combination of elements constituting a simple heating system constructed in accordance with the present invention. The character 6 indicates any suitable type of positive acting pump or impeller which may be of the screw or plunger type and in which the slippage of air past the impelling means is reduced to a minimum. The intake for the pump is indicated at 7, and the outlet therefor is represented by the character 8. From the outlet 8 to the inlet 7 there is provided the continuous circuit fluid conducting pipe or tube 9 which normally functions to convey fluid repeatedly through the circulating system. In order that there may be maintained in the system a proper efficient working pressure of fluid, any suitable type of compressor 10 may be connected in the circuit by means of a supply pipe 12. The compressor preferably includes any suitable type of pressure regulating valve or device 13, designed to maintain a predetermined fluid pressure within the system. To indicate the amount of fluid pressure, there may be installed a suitable gauge or meter 14. The location of the gauge or meter is considered immaterial to the invention.

The character 15 indicates any accepted type of safety valve adapted to operate for relieving the system of excess pressure which may result under various conditions of operation. The safety valve preferably is piped to a remote outlet.

The circuitous fluid conductor or pipe 9 is adapted to have included therein one or more heat radiators or generators 16 that may be installed at any desired or convenient locations in a compartment or compartments. The radiators may be employed to heat atmospheric air, or as indicated at 17, a radiator 18 may be included in a boiler or water heater for supplying hot water without the employment of a separate heater. The inlet and outlet for the water tank or boiler are indicated at 19 and 20, respectively. The character 21 indicates generally a trap, one or more of which may be provided for removal of loose particles of matter that may enter or be formed in the system. The trap may include a suitable valve 22, and it may be provided also with suitable magnetic means 23 so as to restrain any particles of metal that would otherwise circulate through the system and possibly injure some of the working parts. The trap or traps 21 are located preferably at a bend 24 in circuitous pipe 9, in such a manner that the inertia of the particles will perform to deposit them in the trap.

Figure 3:
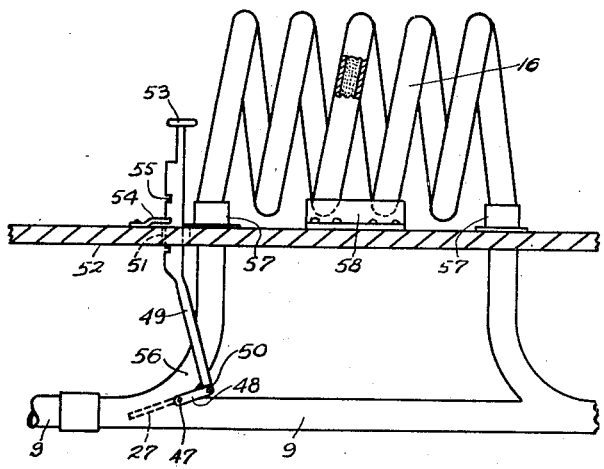
Fig. 3 is an enlarged detail view showing one type of heat radiating element that may be utilized in constructing the heating system.

The valve indicated at 25 is adapted to relieve the system of excess moisture, and similar valves may be included in the system where moisture is apt to accumulate. At 26 is represented a wire or other conductor, of which there may be several, for grounding any static electricity that may be generated by movement of the fluid through the system. With the foregoing explanation, it will be understood that fluid in the circuitous system will be continuously impelled by the pump or impelling device 6, upwardly through the outlet 8, all or part of the fluid being diverted through the several radiators 16 and 18 by means of baffles or valves 27 which may be adjustable as indicated by Fig. 3. The inner surface of each radiator is roughened or has an interrupted or uneven frictional surface upon which the desired heat is generated (see Figs. 4 and 5). In all other parts of the system, the fluid conveying elements preferably are smooth walled so as to reduce frictional heat at all locations other than the radiators. If desired, the fluid conducting pipes or tubes may be covered with suitable insulation, as indicated at 28, to reduce heat losses intermediate the radiating elements.

Figure 2:
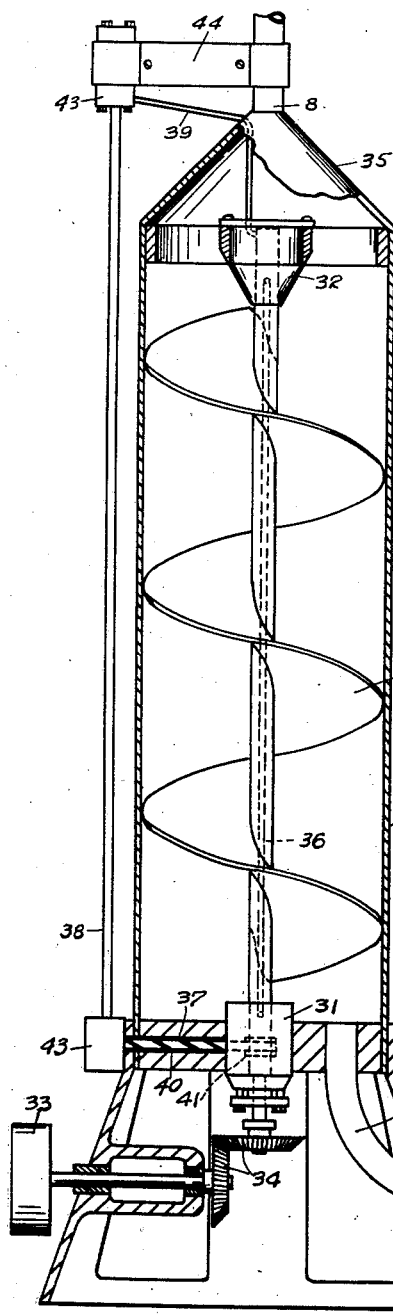
Fig. 2 is a longitudinal cross-sectional view of a fluid impelling device, shown in elevation in Fig. 1, which device forms part of the system.

As illustrated by Fig. 2, the impeller or pump may be constituted of a cylindrical casing 29 having smooth inner walls, the casing being adapted to contain a fluid impelling screw 30 which fits closely within the casing and has its opposite ends supported in suitable bearings 31 and 32. The screw may be rotated in any suitable manner, such as by means of a pulley 33 that may be driven by any available motive power, for example, a steam or electrical motor, or water or wind power. A conventional means of transmitting power from the motive means to the impeller is indicated by means of the meshing gears 34. It will be understood, of course, that an electrical motor may be coupled directly with the vertical shaft of the impeller screw, the mode of transmitting power to the screw being wholly immaterial to the invention. When the impeller 30 is rotated in the proper direction, it functions to suck fluid from the intake or return pipe 7, and to positively and forcefully discharge the fluid into the upper conical cap 35 and through the outlet 8 whence the fluid is driven through the circulating system constituted of the pipe 9 and the several radiators 16 and 18. By preference, the bearing ends of the impeller member 30 are continuously lubricated by means of a circulating system which includes the closed bearings 32 and 31, an axial bore 36 in the impeller shaft, and the lubricant conveying passages and pipes 37, 38, and 39. The passage 37 may include a spiraled shaft 40 rotated by means of a suitable gear arrangement 41, to effect a circulation of lubricant in the manner stated. It will be understood that the impeller shaft bearings may be of the frictionless type if desired, and that any known or accepted means of supplying lubricant thereto may be utilized in place of the means which is described and illustrated herein by way of example. The characters 42 and 43 indicate a lower and an upper reservoir, respectively, for the circulating lubricant. A bracket for supporting the reservoir 43 is shown at 44.

Figures 4, 5:
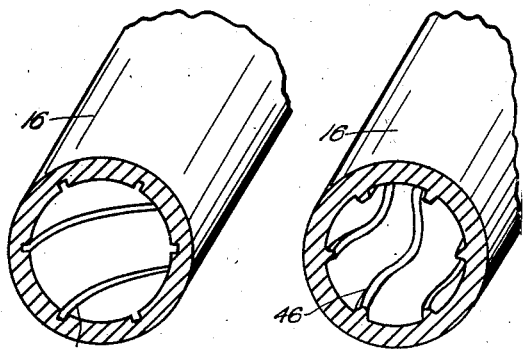
Figs. 4 and 5 are enlarged cross-sectional views showing suggested modes of producing frictional heat in the pipe or coil of a radiator through which the fluid is pumped or circulated.

Due to the fact that the impelling element 30 and the inner wall of the casing 29 are smooth, no appreciable amount of heat will be generated at the pump or impelling means. Likewise, the main fluid conducting tubes or pipes 9 are preferably made smooth inside to preclude the generation of frictional heat in the system generally. The coils or passages of the radiators, however, may have their interior surfaces interrupted or roughened in any suitable manner, there being suggested the spiral grooves 45 of Fig. 4 and the undulatory ribs 46 as shown in Figs. 4 and 5, respectively. A series of studs or projections, or depressions within the radiating devices will be found to provide frictional resistance to the flow of fluid through the radiator, in much the same manner as will be grooves and ribs of Figs. 4 and 5.

It is preferable to employ some form of means for regulating the flow of fluid through the radiators, and one of such means is illustrated in Fig. 3. As shown, the plate or baffle 27 is pivoted at 47, and has associated therewith an arm 48 to which may be pivoted a suitable actuating means 49, the last mentioned pivot being indicated at 50. The actuating means 49 preferably extends through an opening 51 in the floor 52, and is provided with a suitable handle or the like 53. The characters 54 and 55 represent any acceptable type of latch means for maintaining the actuator in various adjusted positions for disposition of the baffle or valve 27 to the closed or open positions. When the valve 27 is elevated to preclude flow of fluid through the branch pipe 56, the fluid will flow through the pipe 9 and will not be diverted into the radiator coils. When the valve is lowered to close the pipe 9 at the branch 56, the fluid under pressure will be conducted through the radiator and will generate heat therein due to the roughened or uneven inner surfaces of the radiating element.

The characters 57 indicate suitable couplings for the ends of the radiator coil, and character 58 indicates a support for the intermediate portion of the coil.

One of the radiators (Fig. 1) is shown enclosed in a water jacket 64, the effect of which is to absorb any possible vibrations that night result in noise due to the velocity of fluid movement therethrough. In some systems, it may be desirable to water-jacket the main conduits also.

The amount of heat generated by the system may be regulated thermostatically by controlling the speed of the pump or impeller which supplies the pump or the motive power for the fluid contained within the system. It is to be understood that the direction in which the fluid is driven through the system is immaterial, and the system may be operated by forcing the fluid therethrough intermittently or in opposite directions. Also, the desired result may be attained by successively compressing and expanding the fluid within the entire continuous circuit or within any section or sections thereof.

It is to be considered within the scope of the present invention, to drive the auxiliary compressor 10 from the power means 33 rather than by a separate motor 60, and to provide interiorly roughened frictional heating sections of main piping, such as 62, at any locations in the system where auxiliary heating may be desired. The latter condition may be carried out to the extent of making the entire circuitous system of frictional heating sections, in which case the individual radiators 16 may be dispensed with or not, as desired. Various other modifications and changes in the structural details of the device may be made, within the scope of the appended claims, without departing from the spirit of the invention.

What is claimed is:

1. The method of heating which comprises effecting unidirectional forced circulation of a gas through a continuous circuit of piping while the gas in all parts of the circuit is maintained under high pressure, and generating heat at desired locations by introducing the flow of gas into areas of increased resistance to the flow thereof.

2. The method of heating which comprises effecting forced unidirectional circulation of a fluid under pressure through a continuous circuit of piping while the fluid in all parts of the circuit is maintained under high pressure, and generating heat at desired locations by introducing the flow of fluid into areas of increased resistance to the flow of fluid.

3. The method of heating which comprises effecting forced circulation of a fluid through a main circuitous conductor having a smooth inner surface, and diverting the fluid at intervals from said main conductor into heat-generating conductors having roughened inner surfaces, the diverted fluid being returned to the main conductor after passage thereof through the heat-generating conductors, to provide a closed system.

4. A heating system comprising in combination a main gas conductor having a substantially smooth inner wall to minimize friction upon passage of a gas therethrough, means for effecting a velocity flow of gas in a highly compressed state through the said main conductor, and means located at intervals along the main conductor for interposition of frictional resistance to the velocity flow, thereby to generate a high degree of heat only at desired locations in the system.

5. A heating system comprising in combination a circuitous main fluid conductor having a substantially smooth inner wall to minimize friction upon passage of a fluid therethrough, means for effecting a velocity flow of fluid through said main conductor, means for maintaining a predetermined fluid pressure in said circuitous conductor, and means located at intervals along the main conductor, for interposition of frictional resistance to the velocity flow, wherey to generate a high degree of heat only at a plurality of desired locations in the system.

6. A heating system comprising in combination a circuitous main fluid conductor having a substantially smooth inner wall to minimize friction upon passage of a fluid therethrough, means for effecting a velocity flow of fluid through said main conductor, means for maintaining a predetermined fluid pressure in said circuitous conductor, and means located at intervals along the main conductor for interposition of frictional resistance to the velocity flow, thereby to generate a high degree of heat only at a plurality of desired locations in the system, and a trap including a magnetic means for restraining movement of magnetic metallic foreign substances through the system.

7. A heating system comprising in combination a circuitous main fluid conductor having a substantially smooth inner wall to minimize friction upon passage of a fluid therethrough, means for effecting a velocity flow of fluid through said main conductor, means for maintaining in the circuitous conductor a fluid pressure greater than atmospheric pressure, a radiator comprising a fluid conductor having a roughened inner surface, and means for diverting the velocity flow of fluid into the radiator.

8. A heating system comprising in combination a circuitous main fluid conductor having a substantially smooth inner wall to minimize friction upon passage of a fluid therethrough, means for effecting a velocity flow of fluid through said main conductor, means for maintaining in the circuitous conductor a fluid pressure greater than atmospheric pressure, a radiator comprising a fluid conductor having a roughened inner surface, means for diverting the velocity flow of fluid into the radiator, and means for returning the diverted fluid to the circuitous conductor.

9. A heating system comprising in combination a circuitous main fluid conductor having a substantially smooth inner wall to minimize friction upon passage of a fluid therethrough, means for effecting a velocity flow of fluid through said main conductor, means for maintaining in the circuitous conductor a fluid pressure greater than atmospheric pressure, a radiator comprising a fluid conductor having a roughened inner surface, means for diverting the velocity flow of fluid into the radiator, means for returning the diverted fluid to the circuitous conductor, and means for removing from the circuitous conductor any foreign substances that would otherwise circulate with the fluid.

ROBERT ARTHUR CROCKETT.
ROBERT HENRY CROCKETT.